Dec. 10, 1929.  D. C. HEIM  1,739,149
MIXING MILL
Filed Jan. 4, 1929  2 Sheets-Sheet 1
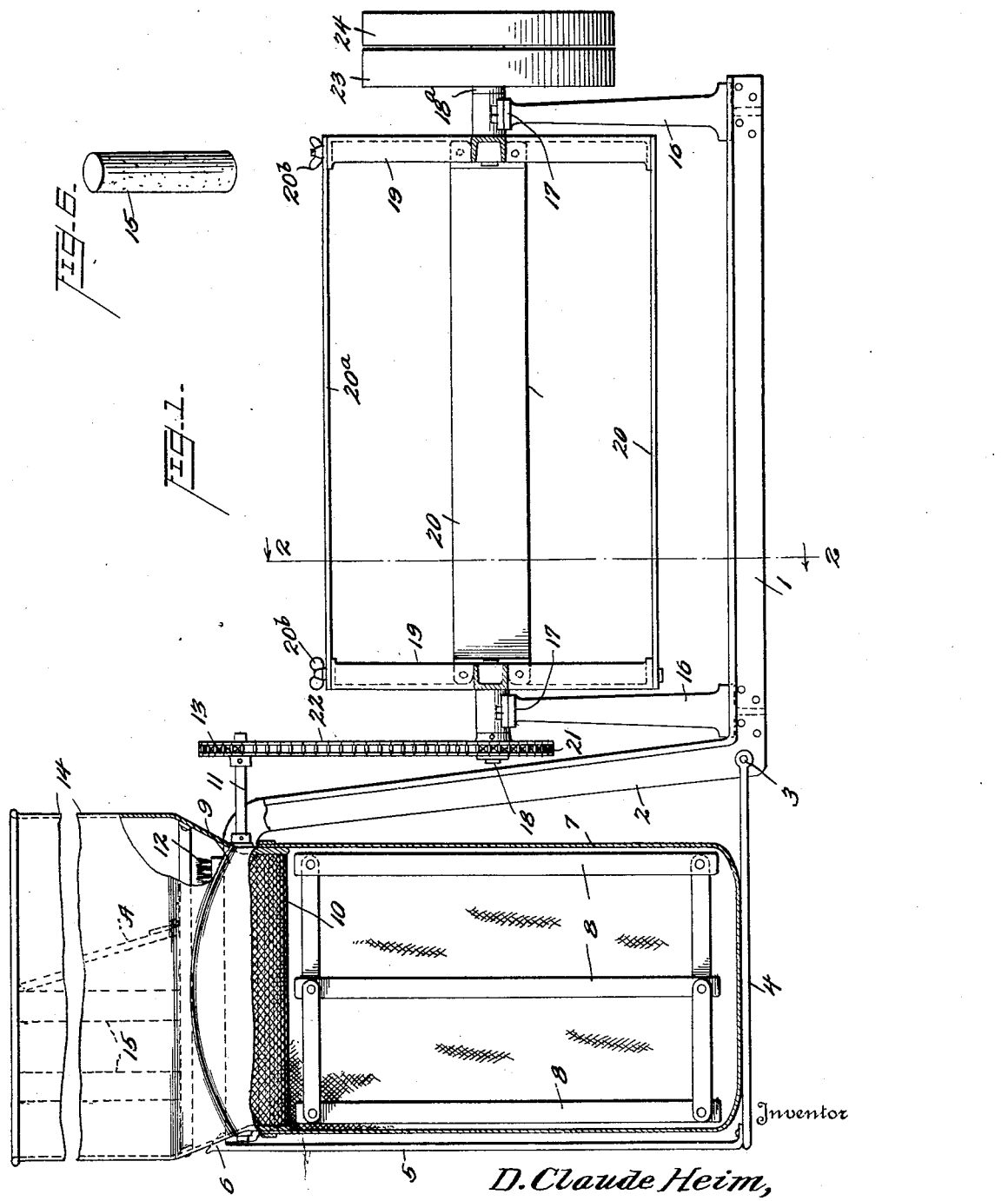
Inventor
D. Claude Heim,
By C. W. Clement
Attorney

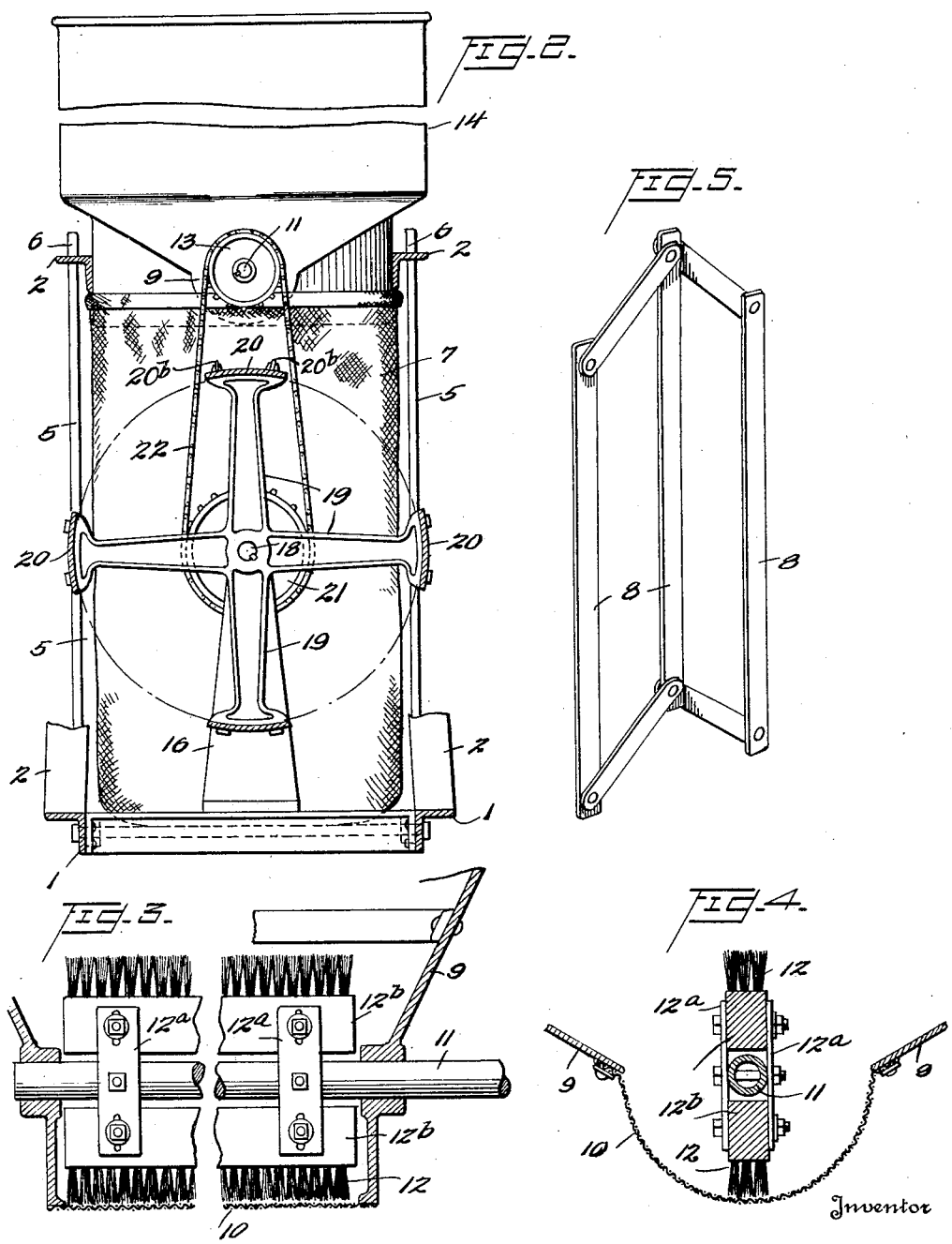

Patented Dec. 10, 1929

1,739,149

UNITED STATES PATENT OFFICE

DANIEL CLAUDE HEIM, OF SUNBURY, PENNSYLVANIA

MIXING MILL

Application filed January 4, 1929. Serial No. 330,233.

This invention relates to mixing mills for properly and thoroughly mixing dry powders or dusts to produce a spraying and dusting compound to combat fungus and insect pests of economic plants, for mixing poultry and stock feeds, fertilizers, and other dry mixtures.

Referring to the accompanying drawings forming a part of this specification in which like reference characters designate like parts in all the views.

Fig. 1 is a side elevation of the machine, the drum, sifter box and rotatable drum-holder being shown partly in section;

Fig. 2 is a section on the line 2—2 of Fig. 1;

Fig. 3 is a vertical section through the sifter box, taken on the line of the shaft and partly broken away;

Fig. 4 is a section on the line 4—4 of Fig. 3;

Fig. 5 is a perspective view of the collapsible dasher; and,

Fig. 6 is a similar view of a container for chemicals to be placed in the hopper.

Referring to the drawings, 1 indicates the base or support of the mixing mill comprising side bars, the ends 2 of which extend upwardly from the base and thence horizontally, as shown. Hinged to the supports 2 at 3 is a platform 4 to the end of which are secured upright retaining arms 5 having a locking means 6 on the end of the same adapted to engage the ends of the lateral members of the supporting arms 2.

The platform 4 is adapted to accommodate a drum or mixing chamber 7, within which is placed a removable collapsible dasher 8.

Supported by the horizontal end portions of the arms 2 is a sifter box 9 at the bottom of which is a semi-cylindrical sieve 10. Passing horizontally through the sifter box 9 is a small shaft 11 to which are secured brushes 12 by means of steel plates 12ª bolted to the same and the brush blocks 12ᵇ, the bolt holes in the steel plates being slotted to permit of adjustment of the brushes. Fixed on the exposed end of the shaft 11 is a sprocket or gear 13. Mounted on the top of the sifter box 9, which may be either separate or made a part of same is a hopper 14 adapted to receive a plurality of small containers 15 which may be square or circular in form. Hinged in the bottom of the hopper 14 is a movable partition A adapted to be placed at different angles within the hopper.

A rotatable drum carrier is mounted upon the base 1, this carrier comprising opposed spiders 19, to which are secured short shafts 18, 18ª, which are journaled in bearings 17 upon pillars 16 which project upwardly from the base. The arms of the spiders are connected by flat bars 20, one of which, 20ª, is readily detachable, this bar being connected to the spiders by wing nuts 20ᵇ, so that the drum may be readily placed within the carrier in horizontal position.

On the outer end of shaft 18 is a sprocket or gear 21, and an operative chain 22 engages the gears 13 and 21. On the outer end of shaft 18ª is a loose pulley 23 and a fixed pulley 24.

The operation of the mill is as follows: A receiving drum or mixing chamber with a dasher in it is placed on the platform, with its open end beneath the sifter box 9. The smaller quantities of the chemicals and other ingredients are weighed out and put in the small containers which in turn are placed in the large hopper. The larger quantities of chemicals, dust and other ingredients are placed in the large hopper around the small containers which are then withdrawn, the hinged bottoms being opened before such removal, the contents are deposited in columns surrounded by the bulk material or materials. The different quantities may also be gauged by the movable partition within the hopper which is placed at any angle desired. Power is applied through the medium of the fixed pulley 24, shafts 18ª and 18, gears 21, 13 and chain 22, which causes the brushes 12 in the sifter box to revolve drawing the contents from the hopper 14 forcing said ingredients through the sieve 10, blending, breaking the lumps and sifting the material together into the receiving drum or chamber. When the hopper is empty the drum or mixing chamber 7 is removed, a tight friction lid pressed into the open end, the drum 7 placed in the horizontal drum carrier above described, and the mixing and blending continued, the dasher holding back a portion of the material, and allowing other portions to fall by, through which operation the contents are thoroughly mixed. While the latter operation is being performed, the contents of the hopper 14 are drawn from the same by the revolving brushes 12, the materials mixed and forced through the sieve 10 into another drum or mixing chamber 7. Thus it will be seen that two operations are being performed at the same time.

The drum or mixing chamber in the rotatable drum-carrier is removed, the dasher taken out, an airtight head put in, and the drum with its perfectly mixed and blended contents is ready for shipment or storage. Throughout the entire operation the ingredients are confined to the drums thus giving a dust leak proof operation.

What I claim and desire to secure by Letters Patent is:

1. In a machine for filling and mixing the contents of cylindrical drums, a base, supporting arms projecting upwardly from the base and having horizontally extending ends, filling devices mounted on said ends, a platform hinged to the base and adapted to support the drum in upright position beneath the filling devices, and means on the free end of the platform for latching it to the ends of the supporting arms.

2. In a machine for filling and mixing the contents of cylindrical drums, a base, supporting arms projecting upwardly from the base and having horizontally extending ends, filling devices, including a rotatable brush, mounted on said ends, means for supporting a drum in upright position beneath said devices, a drum-carrier supported on the base and adapted to hold the drum in horizontal position, said carrier comprising opposed spiders rotatable about a horizontal axis and bars connecting the arms of said spiders, one of said bars being detachable, and gearing connecting said carrier with said rotatable brush.

In testimony whereof I hereunto affix my signature.

D. CLAUDE HEIM.